United States Patent
Lima et al.

(10) Patent No.: US 12,110,121 B2
(45) Date of Patent: Oct. 8, 2024

(54) SYSTEMS AND METHODS FOR DEFINING APU STEADY STATE SPEED ACCORDING TO THE AIRCRAFT OPERATIONAL CONDITIONS

(71) Applicant: Yaborã Indústria Aeronáutica S.A., São José dos Campos-SP (BR)

(72) Inventors: Maurício Rodrigues Lima, São José dos Campos-SP (BR); João Miguel Ferreira Cunha, São José dos Campos-SP (BR)

(73) Assignee: Yaborã Indústria Aeronáutica S.A., São José dos Campos-SP (BR)

( * ) Notice: Subject to any disclaimer, the term of this patent is extended or adjusted under 35 U.S.C. 154(b) by 23 days.

(21) Appl. No.: 17/187,148

(22) Filed: Feb. 26, 2021

(65) Prior Publication Data

US 2021/0276725 A1    Sep. 9, 2021

Related U.S. Application Data

(60) Provisional application No. 62/985,708, filed on Mar. 5, 2020.

(51) Int. Cl.
| | |
|---|---|
| *B64D 31/00* | (2024.01) |
| *B64D 41/00* | (2006.01) |
| *B64F 5/60* | (2017.01) |
| *F02C 9/18* | (2006.01) |

(52) U.S. Cl.
CPC ............ *B64D 31/00* (2013.01); *B64D 41/00* (2013.01); *B64F 5/60* (2017.01); *F02C 9/18* (2013.01)

(58) Field of Classification Search
CPC .... B64D 2013/0611; B64D 2033/0213; B64D 41/00; F02C 9/28; F05D 2220/50
See application file for complete search history.

(56) References Cited

U.S. PATENT DOCUMENTS

| | | | |
|---|---|---|---|
| 6,278,262 | B1 | 8/2001 | Ullyott |
| 7,204,090 | B2 | 4/2007 | O'Connor |
| 7,367,193 | B1 | 5/2008 | Thompson |
| 7,528,499 | B2 | 5/2009 | Suttie |
| 2011/0304157 | A1* | 12/2011 | Poisson ............... F02C 7/268 |
| | | | 290/38 R |
| 2012/0011797 | A1 | 5/2012 | Hilgeman et al. |
| 2013/0013222 | A1* | 1/2013 | Gu ............... F02C 9/00 |
| | | | 702/33 |
| 2016/0039371 | A1* | 2/2016 | Blumer ............... B60L 50/10 |
| | | | 290/31 |
| 2020/0239156 | A1* | 7/2020 | White ............... B64D 41/00 |

FOREIGN PATENT DOCUMENTS

| | | |
|---|---|---|
| CN | 105569847 A | 5/2016 |
| EP | 3101252 | 12/2016 |

OTHER PUBLICATIONS

International Preliminary Report on Patentability (Sep. 6, 2022).
International Search Report (May 28, 2021).
Extended Search Report & Opinion issued in counterpart EP Application No. 21765223.9 on Mar. 11, 2024 (as the USPTO's Global Dossier indicates).

* cited by examiner

*Primary Examiner* — Philip J Bonzell
*Assistant Examiner* — Ashesh Dangol
(74) *Attorney, Agent, or Firm* — Nixon & Vanderhye P.C.

(57) ABSTRACT

A method for defining the steady state speed of an auxiliary power unit (APU) of an aircraft according to the aircraft operating condition.

15 Claims, 4 Drawing Sheets

SYSTEMS AND METHODS FOR DEFINING APU STEADY STATE SPEED ACCORDING TO THE AIRCRAFT OPERATIONAL CONDITIONS

CROSS-REFERENCE TO RELATED APPLICATIONS

The present application claims benefit of 62/985,708 filed Mar. 5, 2020, which is incorporated herein by reference in its entirety and for all purposes.

FIELD

The technology herein relates to aircraft auxiliary power unit (APU) control systems, and more particularly to APU control methods and systems for defining steady state speed of an APU according to aircraft operating conditions.

BACKGROUND & SUMMARY

Existing aircraft typically include two or more primary engines for propulsion. These aircraft also typically include at least one Auxiliary Power Unit (APU) that provides electrical and/or pneumatic power in addition to or in lieu of the power provided by the primary engines. Accordingly, APUs can be used to provide power to the aircraft when the primary engines are not running, for example, when the aircraft is on the ground at an airport gate. The APUs can also provide temporary power to start the primary engines during normal operations, and/or temporary emergency power during an engine-out condition or other emergency condition during flight operations. Additionally, the APU can be used during flight to provide additional electrical and/or pneumatic power whenever the aircraft systems require an amount that exceeds the electrical and/or pneumatic power capability of the primary propulsion engines.

A typical Auxiliary Power Unit (APU) of an aircraft consists of a Gas Turbine Engine that is used in the aircraft operation to provide pneumatic or shaft power to the aircraft systems.

Typically, the APU pneumatic power is used by the aircraft environmental control system to pressurize the aircraft cabin and to feed the aircraft air conditioning systems. APU pneumatic power is also often used to start the main engines.

The APU shaft power is typically converted to electrical power that is used to feed the aircraft systems in a situation where the main engine electrical generator or the aircraft batteries are not available.

Since the APU is typically powered by a thermal (e.g., gas turbine) engine, the APU utilizes aircraft fuel to provide power. Therefore, the APU is, along with the main engine, an aircraft fuel consumption and carbon emission source.

DETAILED DESCRIPTION OF NON-LIMITING EMBODIMENTS

Figure 1:
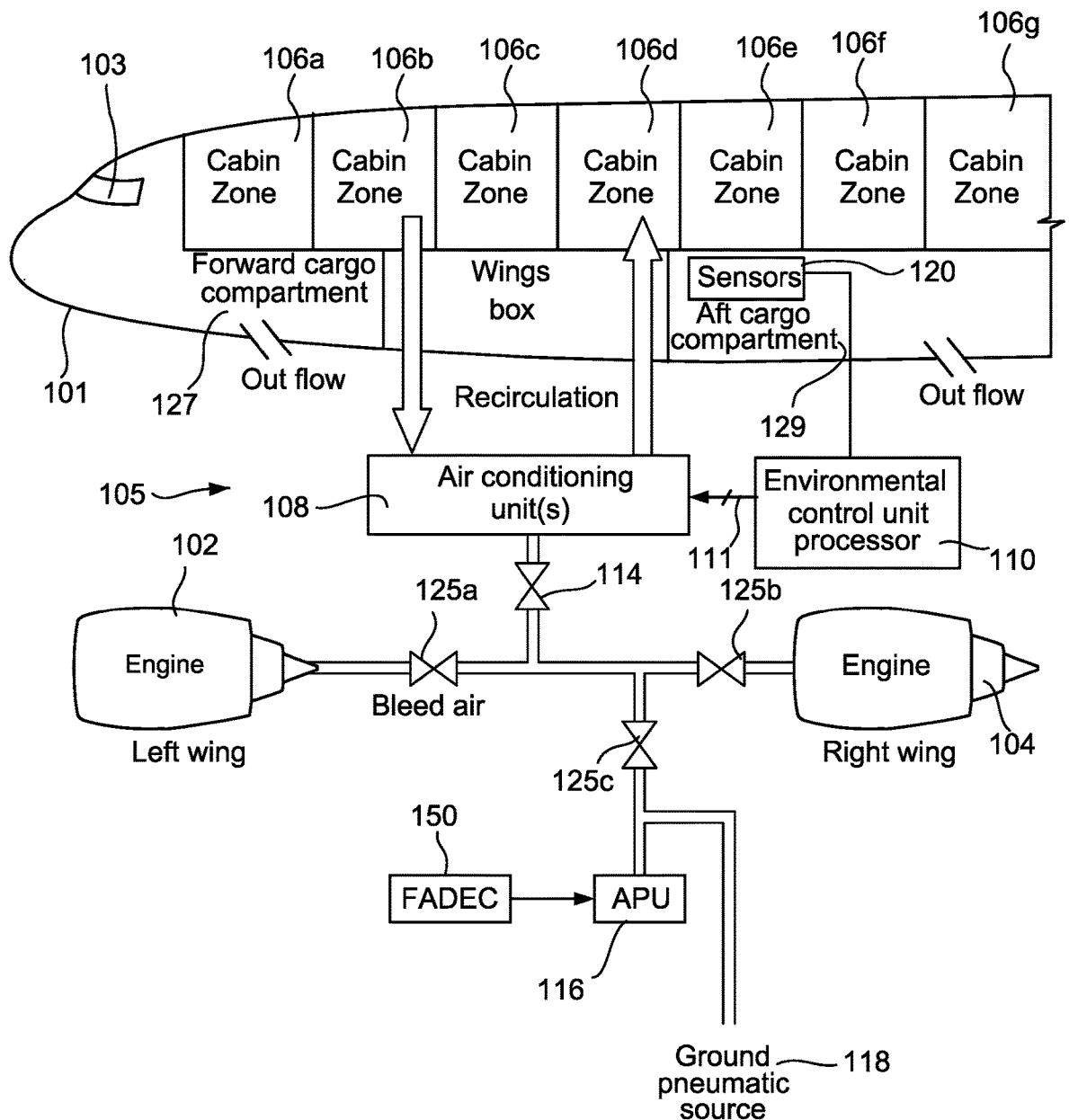
FIG. 1 shows an example aircraft block diagram.

FIG. 1 illustrates working mechanisms of an embodiment of an aircraft including an APU 116. In this aircraft, the normal operation of main gas turbine jet engines 102, 104 produce air that is both compressed (high pressure) and heated (high temperature). While the aircraft is flying, the engines 102, 104 themselves provide a convenient source of pressurized hot air to for example maintain cabin temperature and pressure. In particular, such gas turbine engines 102, 104 use an initial stage air compressor to feed the engine with compressed air. Some of this compressed heated air from certain compressor stages of the operating gas turbine engines 102, 104 is bled from the engine and used for other purposes (e.g., cabin pressurization and temperature maintenance by an environmental control system or ECS under control of an environmental control unit processor 110) without adversely affecting engine operation and efficiency.

Figure 2:
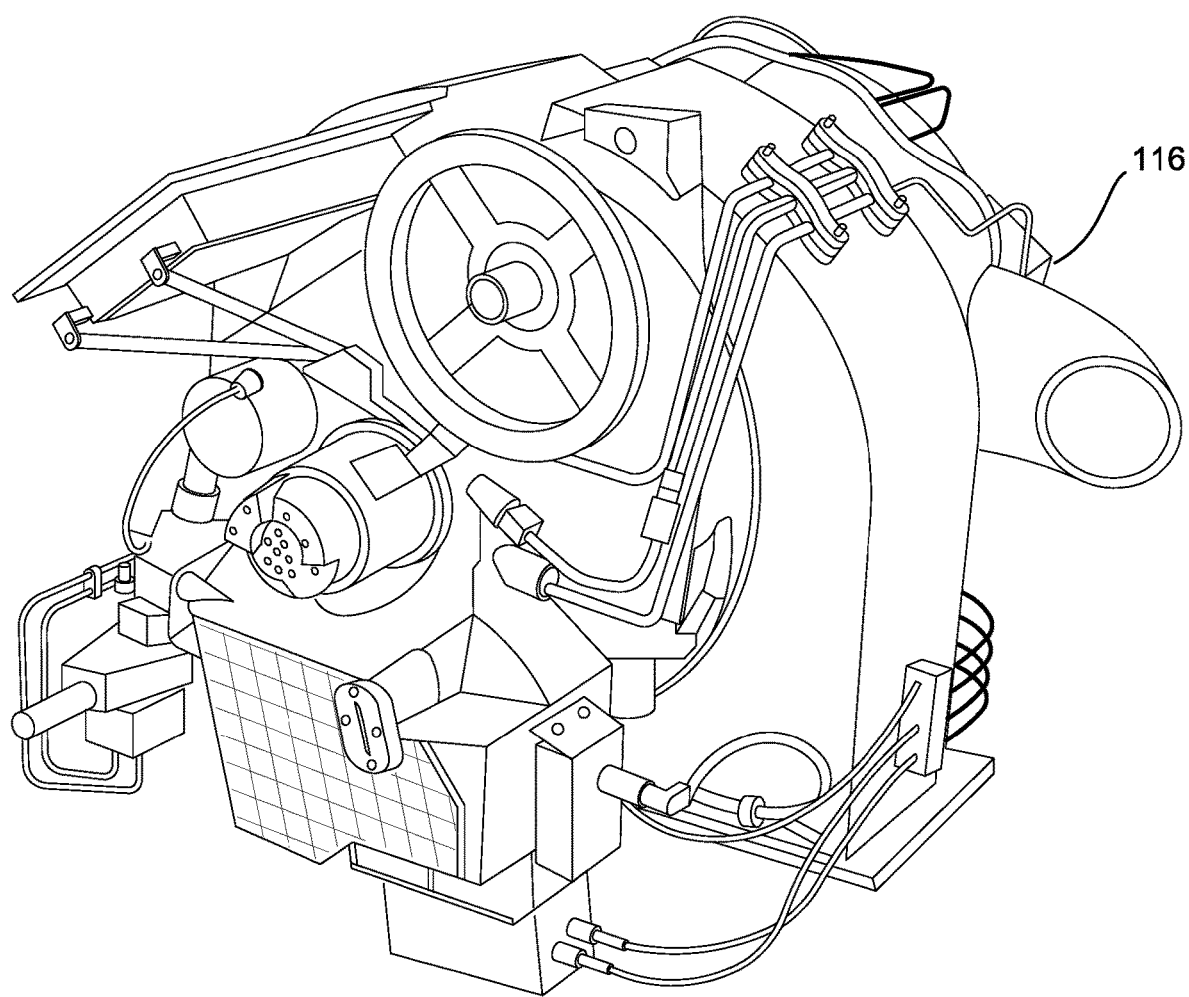
FIG. 2 shows an example auxiliary power unit.

Bleed air provided by the APU 116, the ground pneumatic source 118, the left engine(s) 102, the right engine(s) 104 is supplied for example via bleed airflow manifold and associated pressure regulators and temperature limiters to the ECS air conditioning units 108 of the aircraft. During ground operation of the aircraft, the main engines 102, 104 are typically not operating or are not operating at full capacity. Accordingly, compressed air is supplied from a different source. Such other bleed air sources for ground operation include the APU 116 and the ground pneumatic sources 118. In one non-limiting example embodiment, the APU 116 is a constant speed, integral bleed, continuous cycle gas turbine engine. FIG. 2 shows a non-limiting example of an APU 116—in this case a Pratt & Whitney APS2300 APU comprising an integral bleed, constant speed, continuous cycle gas turbine engine that incorporates a single-stage centrifugal compressor, a reverse flow annular combustor, and a two-stage axial turbine. See for example U.S. Pat. No. 7,204,090, incorporated herein by reference. Other types of conventional APUs 116 can be used.

In one embodiment, the APU 116 includes a power section, a compressor and a gearbox. The APU 116 power section may be a gas turbine that rotates the APU's main shaft. A compressor mounted on the main shaft provides pneumatic power to the aircraft. The compressor typically has two actuated devices: inlet guide vanes which regulate airflow to the load compressor, and a surge control valve which allows the surge-free operation. A gearbox transfers power from the APU 116 main shaft to an oil-cooled electrical generator for generating electrical power. Mechanical power is also transferred inside the gearbox to engine accessories such as a fuel control unit, a cooling fan and a lubrication module. There may be a starter motor connected through the gear train that performs a starting function of rotating the APU main shaft using electrical battery and/or ground electrical or pneumatic power.

Figure 3:
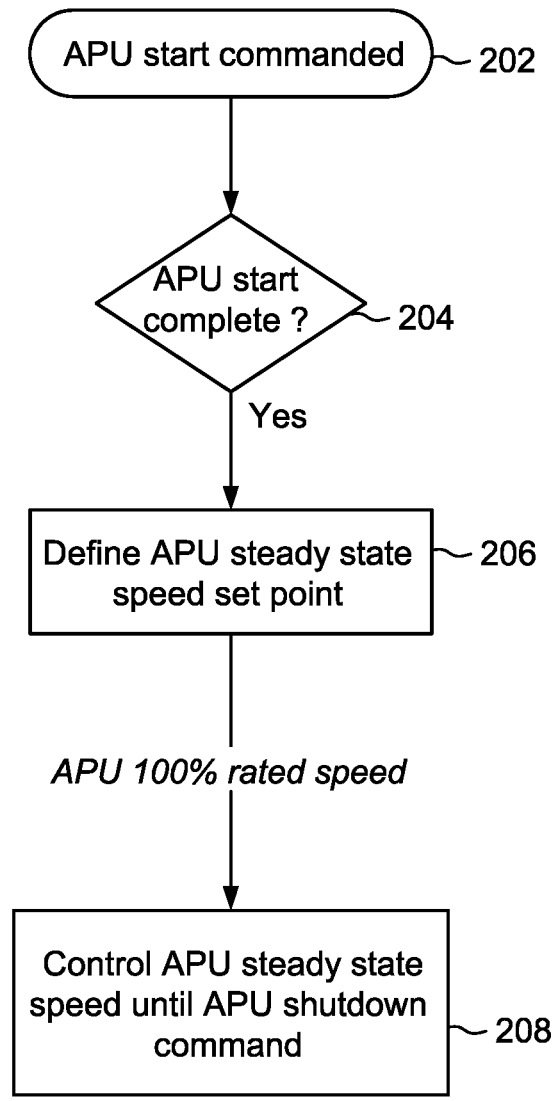
FIG. 3 shows an example conventional (prior art) control method and system.

The APU 116 in one embodiment is operated shown in FIG. 3. The APU start is initiated when commanded by the aircraft pilot (202). Once commanded, aircraft systems provide electrical or pneumatic power to accelerate APU 116 compressor to a point where fuel can be supplied to the combustor and the fuel can be ignited. After the APU 116 combustor is ignited, the aircraft power (motor or pneumatic driver) that supports APU start is gradually removed until APU combustion is sustained self-sufficiently by the mixture of APU compressor air and fuel. APU start is concluded once APU reaches its 100% rated speed (204).

After APU 116 starts at the 100% rated speed of the APU, the APU begins operating in steady state operation where it is capable of providing electrical power and/or pneumatic power to the aircraft. In this operation, the APU 116 typically maintains a constant speed of 100% of its rated speed.

An example principle of APU 116 operation in this stage consists of the following: the aircraft air inlet system provides air to the APU compressor. Pressurized air is conducted to the APU 116 combustor. At this stage, fuel is added to the combustor and the mixture is auto-ignited and directed to the APU turbine. As the air expands, the turbine's rotation provides shaft power to accessories linked to the APU 116 shaft (typically an electrical generator). Pressurized air is bled from the APU compressor to feed pneumatic power to the aircraft systems.

The APU 116 is designed to provide power at 100% rated speed according to the aircraft electrical/pneumatic power demanded by the aircraft. The design includes different operating conditions, such as:

Ground operation and electrical power only:
In-flight operation and no electrical/pneumatic load (stand by power source).
Ground operation and pneumatic power only
Ground operation and pneumatic/electrical power.

These different aircraft/APU operating conditions demand different levels of electrical/pneumatic power from the APU 116. In most cases, these are not necessarily demanding the maximum power capability of the APU 116. Although there are various APU/aircraft operating conditions, the APU steady state speed is conventionally controlled to a single constant 100% rated speed (FIG. 3, 206, 208). Controlling the APU 116 at 100% rated speed allows the aircraft to extract the maximum power that the APU 116 is capable of providing at given ambient conditions (e.g., altitude and temperature). An APU 116 steady state speed is usually controlled by an APU system full authority electronic digital electronic controller (FADEC) 150 (FIG. 1) comprising at least one processor executing program instructions stored in non-transitory memory. In a conventional design, this FADEC 150 controls the APU 116 to operate at a constant speed of 100% of its rated speed.

APU 116 needs fuel to operate. Usually, the APU 116 gets fuel from the same fuel tank as that which supplies the main engines 102, 104. Even though APU 116 is typically much smaller than the main engines 102, 104, the APU's fuel consumption can be substantial.

The APU 116 rotation speed will define the maximum power that can be extracted from the APU. The rated speed of the APU 116 is associated with a fuel consumption rate, and the APU 116 fuel consumption is thus also based on the APU power demanded by the aircraft to maintain that rated speed. The current state of the art APU control technology of FIG. 3 does not take into account APU power demand condition in order to define the APU control steady state speed in order to save fuel consumption.

Figure 4:
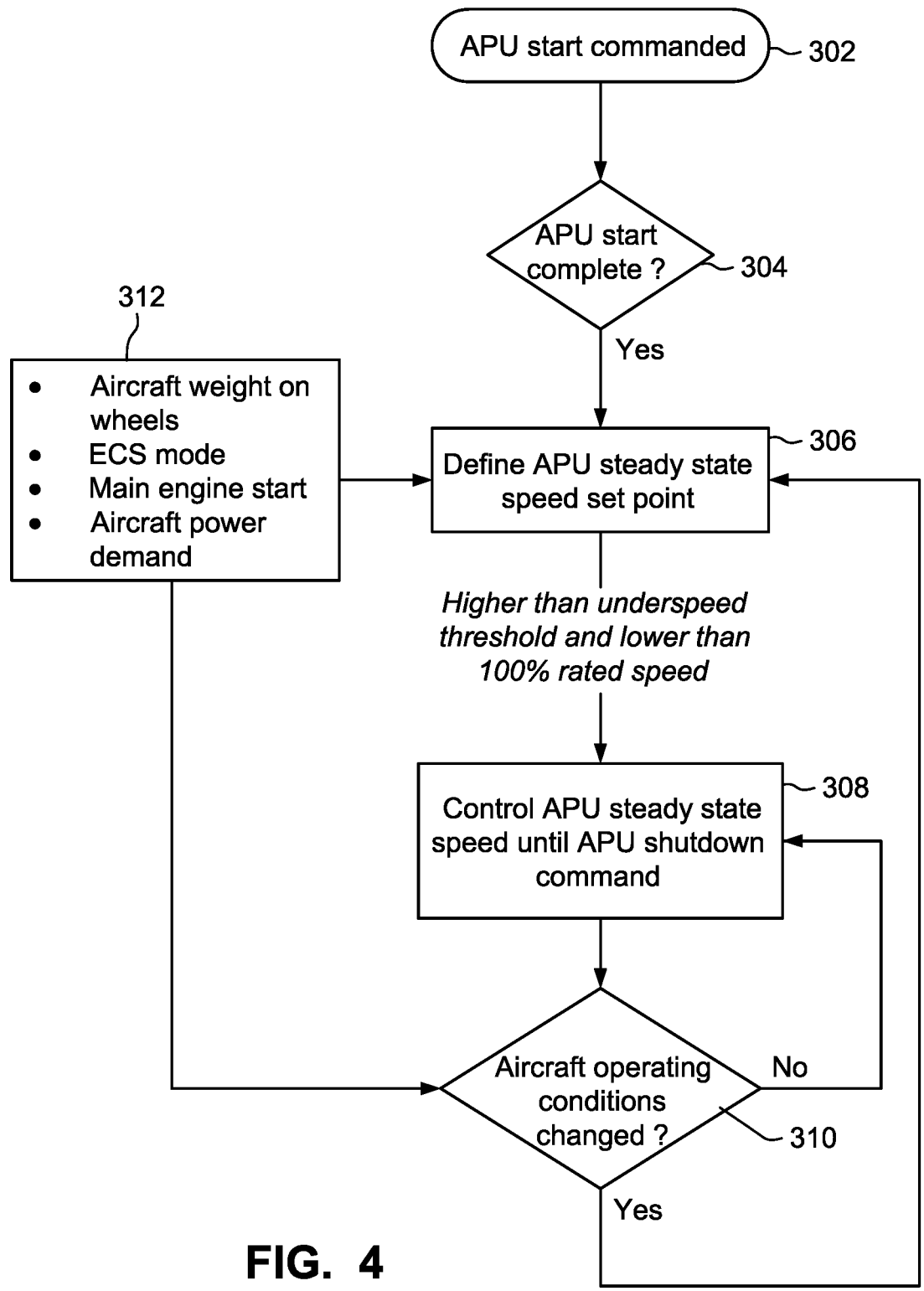
FIG. 4 shows an example non-limiting improvement control method and system.

In contrast to conventional designs, the non-limiting technology herein provides an APU 116 system that controls APU steady state speed according to aircraft/APU operating conditions. FIG. 4 illustrates an example non-limiting proposed method for defining (and varying) the APU steady state speed so it adapts to changing aircraft/APU operating conditions. The example non-limiting technology herein provides methods and systems for defining steady state speed of an APU according to the aircraft operating conditions. In one example embodiment:

a) The APU steady state speed setpoint (306) is to be defined or set according to the aircraft operating condition(s) 312. The APU 116 steady state speed is, in one embodiment, defined as an(y) APU speed that the APU full authority digital engine (or electronics) control (FADEC) 150 is capable of controlling within an acceptable tolerance. In one embodiment, this is a range of speeds that the FADEC 150 can select based on aircraft operating condition(s) 312.

b) The conditions 312 that the example system herein uses to define the APU steady state speed include but may not be limited to any combination or subcombination of: aircraft ground or flight condition, aircraft bleed operation mode (bleed to support main engine start or bleed to aircraft environmental condition controls), ECS (environmental control system) mode, main engine start condition and aircraft power demand.

c) For example, when on ground condition, and while the APU 116 is providing bleed air to the aircraft environmental control system, the APU steady state speed setpoint of one embodiment is set to be (i) less than 100% rated speed and (ii) higher than the APU underspeed threshold (see output to block 306). The APU 116 underspeed threshold referenced in this item c) is, in one embodiment, the minimum APU speed that allows APU combustor sustainable operation.

d) When on ground condition and when the APU is providing bleed air to the main engine start, the APU 116 steady state speed setpoint is 100% APU rated speed. The APU 116 100% rated speed is, in one embodiment, defined as the APU steady state speed that is capable of providing APU maximum pneumatic and electrical power.

e) When in flight condition, the APU steady state speed setpoint is APU 100% rated speed. This APU 116 operating condition resembles a conventional approach, in which the APU is able to be used as a backup thrust source in cases when a main engine fails.

As shown in FIG. 4, when the FADEC 150 detects (e.g., based on various control inputs and sensors such as engine temperature sensors, ambient air temperature and pressure sensors, and other conventional sensors) that aircraft operating conditions have changed (308), the FADEC (in some operating states of the aircraft as described above) updates the APU 116 steady state speed to adapt to these new aircraft operating conditions (310). Such updating continues (endless loop) until APU shutdown command (308).

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

The invention claimed is:

1. In an aircraft comprising a constant speed auxiliary power unit having a rated speed, a control method performing operations including the following with at least one processor:

determining an aircraft operational mode, wherein the determined aircraft operational mode indicates at least an aircraft ground operation mode, an aircraft flight operation mode and an aircraft main engine start operation mode;

selecting a constant steady state speed setpoint of the auxiliary power unit that corresponds to the determined aircraft operational mode, wherein the selected constant steady state speed setpoint of the auxiliary power unit is fixed for the determined aircraft operational mode and is not impacted by factors other than the determined aircraft operational mode, thereby adapting the selected constant steady state speed setpoint of the auxiliary power unit to the determined aircraft operational mode; and controlling the auxiliary power unit to operate at the selected constant steady state speed setpoint.

2. The control method of claim 1 wherein the determined aircraft operational mode is responsive to a weight on wheels.

3. The control method of claim 1 wherein the aircraft operational mode further indicates a combination of an environmental control system (ECS) air-conditioning ON/OFF mode, and main engine operation.

4. The control method of claim 1 wherein the aircraft operational mode further indicates aircraft bleed operation.

5. The control method of claim 1 wherein the controlling the auxiliary power unit includes setting the constant steady state speed setpoint of the auxiliary power unit to be (i) less than 100% of the rated speed and (ii) higher than an auxiliary power unit underspeed threshold.

6. The control method of claim 1 further including when the aircraft operational mode comprises the aircraft ground operation mode and when B the auxiliary power unit is providing bleed air to start a main engine, the at least one processor setting the selected constant steady slate speed setpoint of the auxiliary power unit to 100% rated speed of the auxiliary power unit, wherein the 100% rated speed is a steady state speed of the auxiliary power unit that is capable of providing maximum pneumatic and electrical power from the auxiliary power unit.

7. The control method of claim 1 further including when the aircraft operational mode is the aircraft flight operation mode, the at least one processor setting the constant steady state speed setpoint of the auxiliary power unit to be 100% rated speed, wherein the 100% rated speed is a steady state speed of the auxiliary power unit for providing maximum pneumatic and electrical power.

8. An aircraft comprising:
an auxiliary power unit, and
at least one processor operatively coupled to the auxiliary power unit, the at least one processor being configured to perform operations including the following:
determining an aircraft operational mode, wherein the determined aircraft operational mode indicates at least an aircraft ground operation mode, an aircraft flight operation mode and an aircraft main engine start operation mode;
selecting a constant steady state speed setpoint of the auxiliary power unit that corresponds to the determined aircraft operational condition mode, wherein the selected constant steady state speed setpoint of the auxiliary power unit is fixed for the determined aircraft operational mode and is not impacted by factors other than the determined aircraft operational mode, thereby adapting the selected constant steady state speed of the auxiliary power unit to the determined aircraft operational mode; and
B controlling the auxiliary power unit to operate at the selected constant steady state speed setpoint.

9. The aircraft of claim 8 wherein the aircraft operational mode further indicates the aircraft ground operation mode with electrical power only, the aircraft ground operation mode with pneumatic power only, or the aircraft ground operation mode with pneumatic/electrical power.

10. The aircraft of claim 8 wherein the determined aircraft operational mode is responsive to a weight on wheels.

11. The aircraft of claim 8 wherein the determined aircraft operational mode indicates a combination of an environmental control system (ECS) air-conditioning ON/OFF mode, and main engine operation.

12. The aircraft of claim 8 wherein the determined aircraft operational mode further indicates aircraft bleed operation.

13. The aircraft of claim 8 wherein the at least one processor is configured to set the selected constant steady state speed setpoint of the auxiliary power unit to be (i) less than 100% of a rated speed of the auxiliary power unit and (ii) higher than an auxiliary power unit underspeed threshold.

14. The aircraft of claim 8 wherein the at least one processor is configured to set the selected constant steady state setpoint of the auxiliary power unit, when the determined aircraft operational mode comprises the aircraft ground operation mode and when the auxiliary power unit is providing bleed air to start a main engine, to 100% rated speed of the auxiliary power unit, wherein the 100% rated speed is an auxiliary power unit steady state speed that is capable of providing maximum pneumatic and electrical power from the auxiliary power unit.

15. The aircraft of claim 8 wherein the at least one processor is configured to set the constant steady state speed setpoint of the auxiliary power unit when the aircraft operational mode comprises the aircraft flight operation mode, to be 100% rated B speed, wherein the 100% rated speed is an auxiliary power unit steady state speed that is capable of providing maximum pneumatic and electrical power from the auxiliary power unit.

* * * * *